United States Patent [19]

Reid et al.

[11] Patent Number: 4,646,286

[45] Date of Patent: Feb. 24, 1987

[54] COMMUNICATIONS SYSTEM WITH PROTECTION SWITCHING AND CHANNEL IDENTITIES

[75] Inventors: David I. Reid, Edmonton; John C. Ellson; Malcolm C. Betts, both of Sherwood Park, all of Canada

[73] Assignee: Northern Telecom Limited, Montreal, Canada

[21] Appl. No.: 761,925

[22] Filed: Aug. 2, 1985

[51] Int. Cl.$^4$ .............................................. H04J 3/14
[52] U.S. Cl. .................................. 370/16; 340/825.01
[58] Field of Search ...... 370/16; 179/18 EA, 175.3 S; 340/825.01

[56] References Cited

U.S. PATENT DOCUMENTS

| | | | |
|---|---|---|---|
| 4,365,247 | 12/1982 | Bargeton | 340/825.01 |
| 4,376,999 | 3/1983 | Abbott et al. | 370/16 |
| 4,382,294 | 5/1983 | Beuscher et al. | 370/16 |
| 4,412,323 | 10/1983 | Abbott et al. | 370/16 |
| 4,455,645 | 6/1984 | Mijioka et al. | 370/16 |
| 4,463,350 | 7/1984 | Kajiura et al. | 340/825.01 |
| 4,543,651 | 9/1985 | Chang | 370/16 |
| 4,598,399 | 7/1986 | Bath | 370/16 |

Primary Examiner—Douglas W. Olms
Assistant Examiner—Kenneth I. Rokoff
Attorney, Agent, or Firm—R. John Haley

[57] ABSTRACT

An optical fiber communications system with a plurality of bidirectional channels and a protection channel is disclosed. Each channel has a respective identity which is transmitted in the traffic of that channel and in the event of a protection switch is identified in the protection channel traffic. A protection switch is effected by detecting a channel failure at the receive end of a span, transmitting a protection request on the return channel back to the transmit end of the span, and using this request in a controller for the channel to effect a protection switch, using an individual selector for the channel, if a priority scheme allows. The controllers are enabled or disabled under software control following a protection switch in accordance with the prevailing priority scheme. The arrangement provides for rapid protection switching.

17 Claims, 6 Drawing Figures

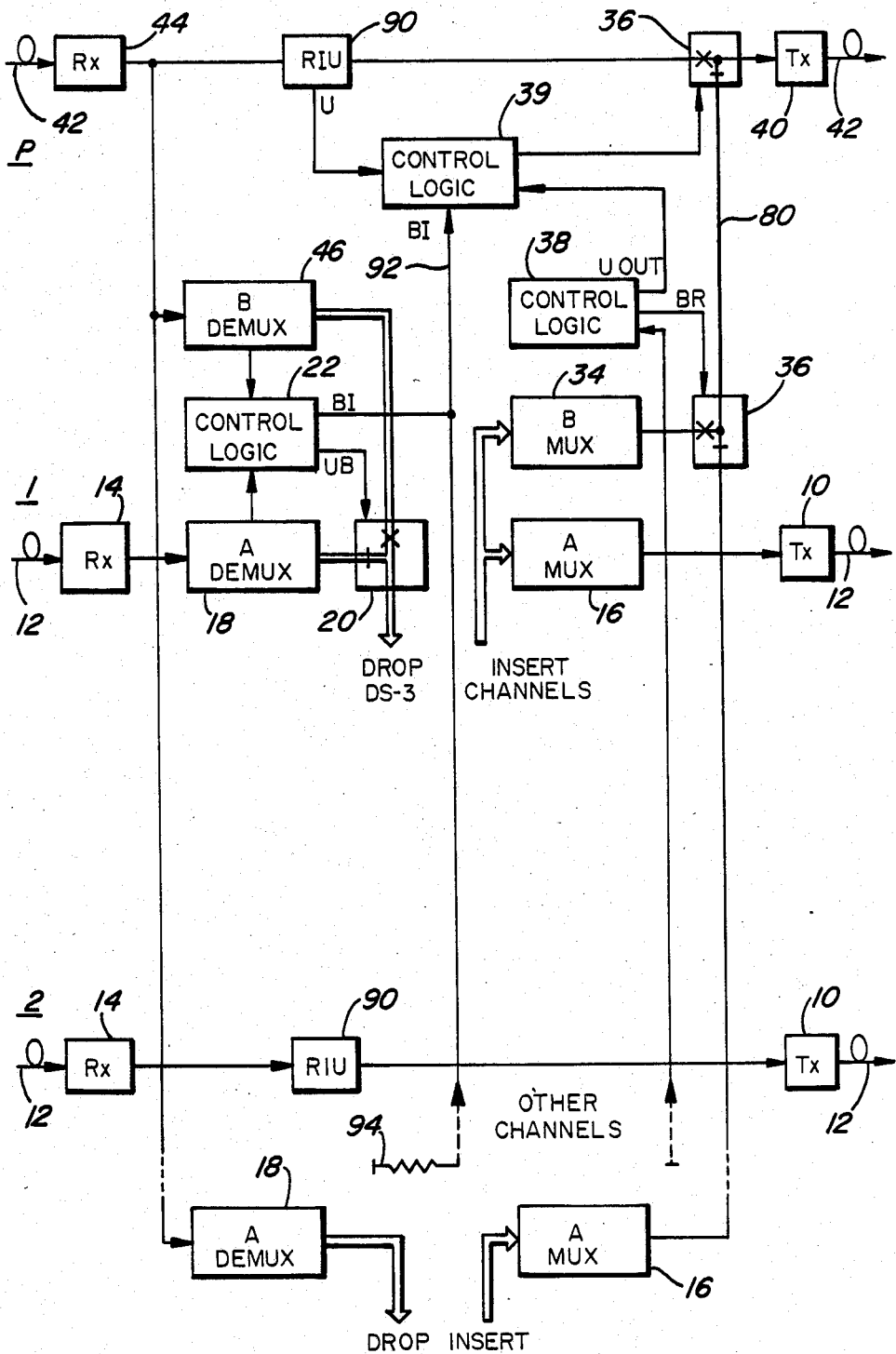
FIG. 6   OPTIONAL EXTRA DS-3 CHANNELS

COMMUNICATIONS SYSTEM WITH PROTECTION SWITCHING AND CHANNEL IDENTITIES

This invention relates to communications sytems, and is particularly concerned with the control of so-called protection switching in a communications system.

Reference is directed to our copending U.S. patent application Ser. No. 761,926 filed simultaneously herewith and entitled "Communications System with Protection Switching using Individual Selectors" which is directed to other features of the system described herein.

It is known to provide a plurality of communications channels, for example optical fiber transmission channels on which digital signals are transmitted in time division multiplexed frames, between different locations. In order to maintain transmission in the event of a fault on one of the channels, it is also known to provide a so-called protection channel via which the traffic of a faulty channel is transmitted. The routing of traffic from a faulty channel onto the protection channel is referred to as protection switching.

Several problems arise in achieving effective protection switching in such a system. Firstly, it is necessary for the protection switching to take place rapidly in the event of a fault, so that information is not unnecessarily lost. At the same time, it is desirable for the various channels to be able to have different priorities, so that in the event of faults occurring on more than one channel the protection channel is awarded to the highest priority faulty channel. The resolution of priorities generally involves software procedures implemented by processors at the respective locations, which processors must communicate with one another. This communication involves delays which conflict with the requirement for rapid switching.

Secondly, the system may include an arbitrary number of intermediate sites between end locations, individual channels being optionally repeatered or dropped and inserted at each intermediate site. The protection switching should desirably accommodate all possible situations in an efficient manner, the protection channel being used only insofar as it is required for routing traffic around faulty parts of normal channels. In this manner, a single protection channel can be used to protect traffic from faults on a plurality of normal channels in different parts of the system.

The protection channel may be used for the transmission of additional information in the event that protection switching is not currently required. In any event, it is also necessary for each site at which traffic on the protection channel may be received to be able to route this traffic to the intended destination.

An object of this invention is to provide an improved method of controlling routing of traffic to the protection channel in a communications system.

According to one aspect of this invention there is provided, in a communications system comprising communications channels extending between first and second locations, the channels comprising at least one forward channel for carrying traffic in normal operation from the first location to the second location, a protection channel for carrying the traffic of a forward channel in the event of a fault on the forward channel, and at least one reverse channel for carrying signals from the second location to the first location, a method of controlling routing of traffic to the protection channel comprising the steps of: detecting at the second location a fault on a forward channel; transmitting an indication of the fault via a reverse channel from the second location to the first location; in response to the fault indication, supplying traffic of the forward channel having the fault to the protection channel, the traffic supplied to the protection channel including an identity of the forward channel having the fault; and at the second location, replacing the traffic of the forward channel having the fault with the traffic supplied via the protection channel in dependence upon the channel identity in the traffic on the protection channel.

The transmission of the fault indication on the reverse channel, coupled with the insertion of the channel identity in the traffic consequently routed via the protection channel, and recognition of this at the second location whereby this traffic can be correctly directed to its intended destination, enable protection switching to be accomplished in a particularly rapid and expedient manner.

Preferably there is a plurality of forward channels and a corresponding number of reverse channels, and the indication of a fault on one of the forward channels is transmitted from the second location to the first location on a corresponding one of the reverse channels. Preferably the forward and reverse channels constitute respectively reverse and forward channels for the opposite direction of transmission, from the second location to the first location, a reverse protection channel being provided for protecting traffic carried in said opposite direction of transmission. Thus a fully bidirectional and well protected communications system can be readily provided using the method of the invention.

In order to avoid delays in protection switching due to resolution of priorities for the different channels, preferably the step of supplying traffic of a forward channel having a fault to the protection channel comprises controlling a selector of the forward channel having the fault to supply the traffic of the forward channel having the fault to the protection channel, and inhibiting a selector of each other channel from supplying traffic to the protection channel. Thus protection switching takes place rapidly under hardware control. To resolve priorities where the channels have respective priorities, the method preferably includes the step of enabling, following the inhibition of the selector of each other channel, the selector of each channel having a higher priority than that of the channel having the fault, to supply traffic to the protection channel in response to a fault indication indicating a fault on the higher priority channel. Thus after a rapid protection switch, software controls can be applied to prepare the selectors of the channels for a subsequent protection switch in dependence upon the priority scheme which is in effect.

The traffic on each channel is conveniently transmitted in a time division multiplexed frame structure including bits for the channel identity and the indication of a fault, the channel identity being part of the traffic on each forward channel.

The method preferably also includes the steps of: transmitting information via the protection channel when traffic from a forward channel is not being supplied thereto; supplying traffic of a forward channel having a fault to the protection channel with an indication that the traffic is protection traffic; and, at the second location: detecting said indication in the traffic on the protection channel to produce a repeater control signal; producing an inhibit signal in response to detection of a fault on a forward channel; and repeating the traffic on the protection channel for transmission from the second location to a third location in response to the repeater control signal in the absence of the inhibit signal. In this manner additional traffic can be transmitted via the protection channel, the indication on this channel also being constituted by the state of one bit in the frame structure. This also permits different spans of the protection channel to be used efficiently for protecting different channels simultaneously, in the manner described in detail below.

According to another aspect this invention provides a communications system comprising: communications channels extending between first and second locations, the channels comprising at least one forward channel for carrying traffic in normal operation from the first location to the second location, a protection channel for carrying the traffic of a forward channel in the event of a fault on the forward channel, and at least one reverse channel for carrying signals from the second location to the first location; means at the second location for detecting a fault on each forward channel and for producing a fault indication in response to such detection; means for transmitting the fault indication via a reverse channel from the second location to the first location; means at the first location responsive to the fault indication for supplying traffic of the forward channel having the fault to the protection channel with an identity of the forward channel having the fault; and means at the second location for replacing the traffic of the forward channel having the fault with the traffic supplied via the protection channel in dependence upon the channel identity in the traffic on the protection channel.

The invention will be further understood from the following description with reference to the accompanying drawings, in which:

FIG. 1 schematically illustrates parts of a first terminal of an optical fiber communications system incorporating an embodiment of the invention;

FIG. 2 schematically illustrates parts of a second terminal of the optical fiber communications system;

FIG. 6 schematically illustrates parts of an intermediate unit of the optical fiber communications system.

Figure 1:
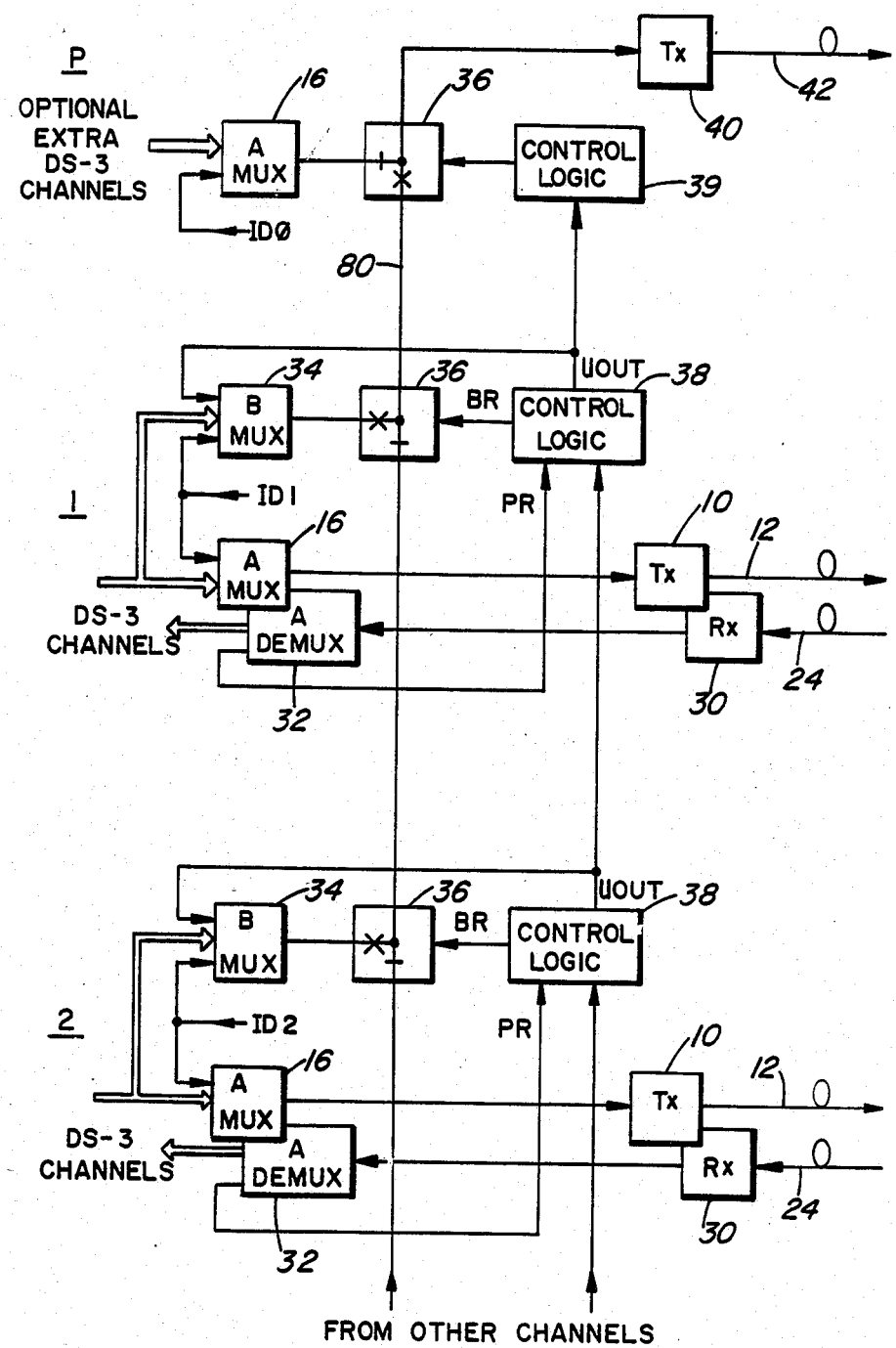

The invention is described in the context of an optical fiber communications system in which a plurality of optical fiber channels, each transmitting digital signals at a bit rate of about 570 Mb/s, extend from a first terminal, optionally via intermediate units, to a second terminal, and back again whereby signals can be transmitted in both directions. For clarity and simplicity in the description, the first terminal is referred to as the head end and the second terminal is referred to as the tail end of the system, the channels providing transmission from the head end to the tail end are referred to as forward channels or simply as channels, and the channels providing transmission from the tail end to the head end are referred to as reverse channels. The system is fully bidirectional and the same comments apply equally to both transmission directions. However, for simplicity the description refers to the reverse channels only where it is necessary to do so for a complete understanding of this embodiment of the invention.

Each 570 Mb/s optical fiber channel provides for the transmission of twelve DS-3 bit rate channels (about 45 Mb/s each) and overhead information in a time division multiplexed frame format with a frame period of 1.21 $\mu$s and master frames each comprising twelve frames and having a period of 14.5 $\mu$s. Individual bits in each master frame are used for purposes related to protection signalling in the manner described in detail below.

The optical fiber channels comprise one or more working channels, each of which carries normal traffic in the manner described above, and a protection or P channel on which traffic is transmitted in the event of a failure on one of the working channels, the routing of traffic onto the P channel being referred to as a protection switch. The P channel can also be used for transmitting other information, for example more DS-3 channels of a relatively low priority, when it is not being used for protection purposes (i.e. transmission of traffic on a failed channel). The following description relates to two working channels 1 and 2, in addition to the protection channel P. Other working channels may be provided in a similar manner.

The system may include an arbitrary number of intermediate units between the head end and the tail end of the system. Each such intermediate unit, which is provided at a respective location or intermediate site, may provide glass-through (i.e. the optical fibers are interconnected without any intervening electronics), repeater, or drop-and-insert (i.e. DS-3 channels may be tapped) capabilities for the optical fiber channels in arbitrary combinations. The communications links between the head and tail end and an adjacent intermediate unit, or between consecutive intermediate units, are referred to as spans.

In this embodiment of the invention, the P channel can be used to provide protection for faults on a plurality of working channels where these faults occur on different spans. For example, with two working channels 1 and 2 passing on two spans from the head end via one intermediate unit, providing drop-and-insert capabilities for each of the working channels, to the tail end, a fault on the first span of channel 1 can be protected by the first span of the P channel while a simultaneously existing fault on the second span of channel 2 can be protected by the second span of the P channel.

Figure 2:
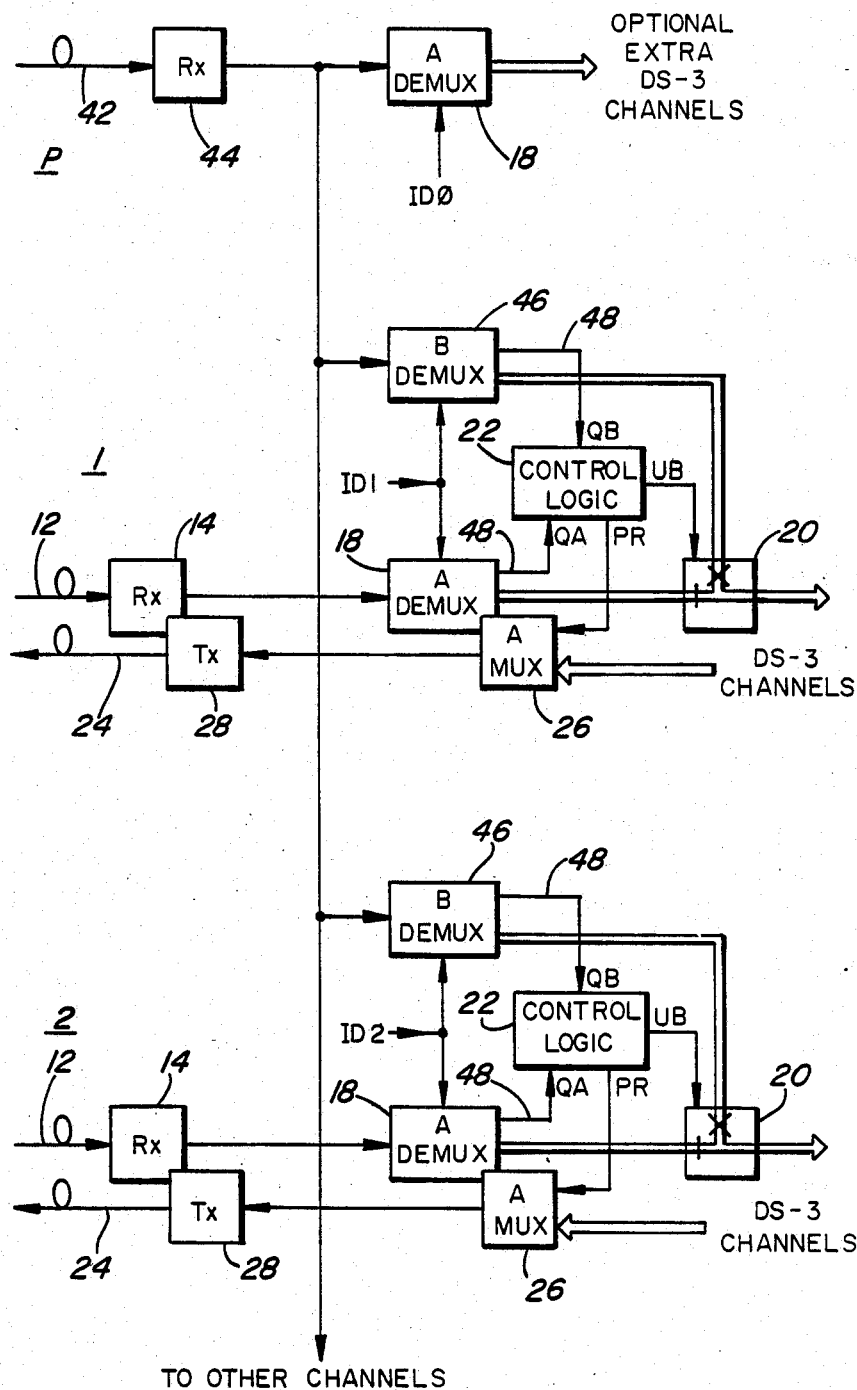

The system is initially described with reference to FIGS. 1 and 2, illustrating the head end and tail end respectively, which can be placed side by side with FIG. 1 on the left in order to show clearly the signal flows therebetween.

Each of the working channels 1 and 2 includes, for the forward channel from an optical transmitter 10 via an optical fiber 12 to an optical receiver 14, a first multiplexer (MUX) 16, which is referred to as the A MUX, at the head end (FIG. 1) for multiplexing twelve incoming synchronized DS-3 channels and overhead information in the manner already described above and supplying the multiplexed signal to the transmitter 10, and a first demultiplexer (DEMUX) 18, which is referred to as the A DEMUX, at the tail end (FIG. 2) for demultiplexing the signal from the receiver to produce twelve outgoing DS-3 channels and overhead information. At the tail end the outgoing DS-3 channels are derived via a selector 20 controlled by a control logic unit 22 in the manner described below. FIGS. 1 and 2 also show, for the reverse channels 1 and 2 on reverse channel optical fibers 24, the corresponding A MUX 26 and optical transmitter 28 at the tail end and the optical receiver 30 and A DEMUX 32 at the head end for transmitting traffic in the opposite direction of transmission.

In order to protect against a failure anywhere on a working channel between the A MUX 16 and the A DEMUX 18, including the MUX 16 and DEMUX 18 themselves, traffic (the multiplexed DS-3 channels and the overhead information) can be routed via a second multiplexer 34, which is referred to as the B MUX, at the head end, an optical transmitter 40, forward channel fiber 42, and optical receiver 44 of the protection channel P, and a second demultiplexer 46, which is referred to as the B DEMUX, and the selector 20 at the tail end. Corresponding protection paths, not shown, exist for the reverse direction of transmission. In order that the protection channel P can carry optional extra traffic when it is not being used to carry traffic from a failed working channel, the channel P also includes an A MUX 16 (but no B MUX), a selector 36, and a control logic unit 39 at the head end and an A DEMUX 18 (but no B DEMUX) at the tail end.

It will be noted that the output of the receiver 44 of the P channel is coupled to the input of the A DEMUX 18 of the P channel and to the B DEMUX 46 of each working channel. In order to enable the traffic which is being carried on the P channel to be identified, each channel is allocated a respective channel identity, represented by ID0 to ID2 for the channels P, 1, and 2 respectively, which is transmitted as part of the overhead information in the multiplexed signals. To this end, for each channel the channel identity is supplied to the respective multiplexers 16 and 34 to be multiplexed into the overhead information, and to the respective demultiplexers 18 and 46 to be compared with the incoming received and demultiplexed channel identity. The result of this comparison is supplied via a respective line 48 to the respective control logic unit 22.

Figure 3:
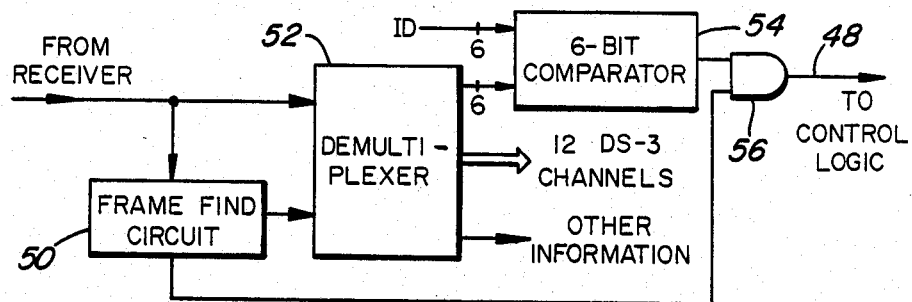
FIG. 3 is a schematic block diagram illustrating parts of a demultiplexer unit of the system.

FIG. 3 illustrates the form of each demultiplexer, showing the comparison of the channel identity which is assumed here to consist of a 6-bit number. In this respect, it is observed that in this embodiment of the invention it is not essential for the A DEMUX 18 in each working channel to include such a comparison, but for convenience all of the demultiplexers have the same form. Similarly, all of the multiplexers have the same form, even though it is not essential in this embodiment of the invention for the channel identity to be inserted in the traffic on each working channel.

Referring to FIG. 3, each A DEMUX 18 or B DEMUX 46 includes a frame find circuit 50 and a demultiplexer unit 52 which operate in generally known manner on the incoming multiplexed signal from the respective receiver to produce the demultiplexed DS-3 channels, the 6-bit channel identity from the multiplexed signal, and other (overhead) information. A 6-bit comparator 54 compares the demultiplexed channel identity with the locally supplied channel identity ID and produces an output signal dependent on the result of this comparison, which output signal is gated in an AND gate 56 with a 'frame found' signal produced by the frame find circuit 50 on a line 58 to produce the signal on the line 48. Although not shown in FIG. 3, the demultiplexer also uses the signal on the line 48 to squelch, or completely suppress, its DS-3 channel and other information outputs in the absence of frame synchronization or in the case of a channel identity mismatch.

Before describing the manner in which a protection switch is effected, the various states which can be adopted by each of the control logic units 22 and 38, for controlling the selectors 20 and 36 respectively, are described with reference to simplified state diagrams in FIGS. 4 and 5 respectively.

Figure 4:
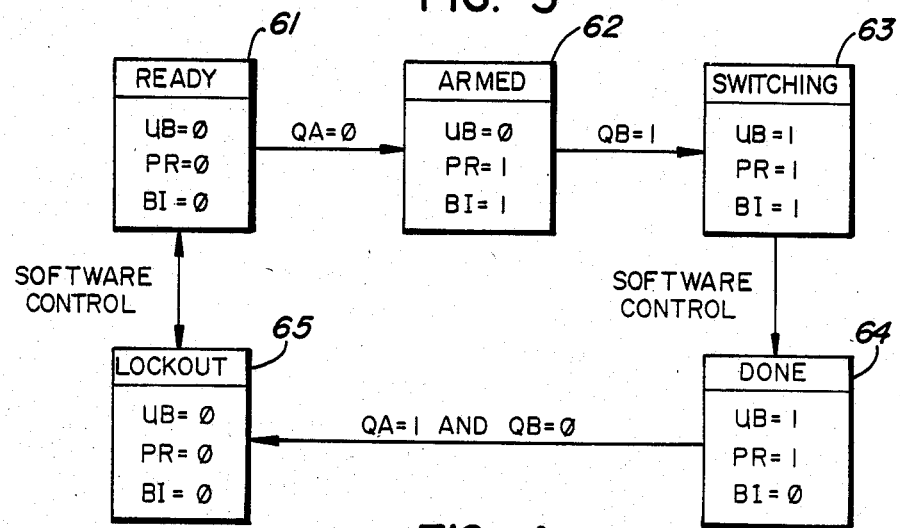
FIGS. 4 and 5 are state diagrams with reference to which the operation of control logic units of the system are described.

Referring to FIGS. 2 and 4, each of the control logic units 22 has five possible states 61 to 65 referred to as READY, ARMED, SWITCHING, DONE, and LOCKOUT respectively. Each unit 22 receives signals on two lines 48 from the respective A DEMUX and B DEMUX; these signals are referred to as QA and QB respectively, representing the quality of the signal received by the respective demultiplexer. Each unit 22 produces three signals UB, PR, and BI. The signal BI is not shown in FIG. 2 as it is used only at intermediate units, and is described below with reference to FIG. 6. The signal UB constitutes a control signal to the respective selector 20; the signal UB=1 constitutes a control command to use the output of the B DEMUX for the outgoing DS-3 channels. The signal PR is a protection request signal which is supplied by the unit 22 to the A MUX (and the B MUX) of the reverse channel for transmission, as one bit in the overhead information in each master frame, back to the head end.

Figure 5:
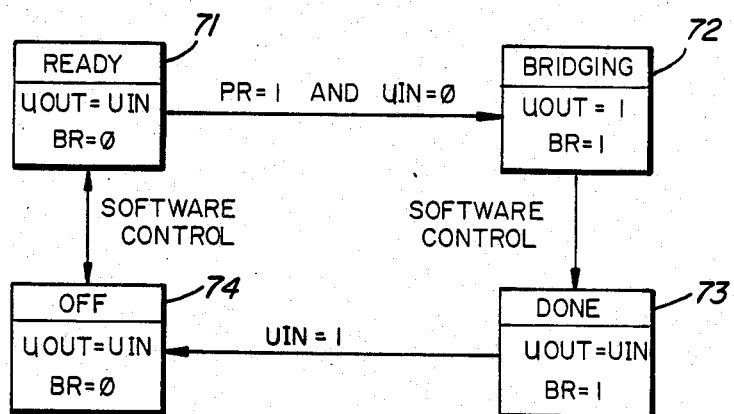

With reference to FIGS. 1 and 5, each of the control logic units 38 has four possible states 71 to 74 referred to as READY, BRIDGING, DONE, and OFF respectively. Each unit 38 receives the protection request signal PR, derived from an output of the respective A DEMUX 32 of the reverse channel, and a signal UIN from the next lower (as illustrated in FIG. 1) channel. Each unit 38 produces a bridging signal BR which controls the respective selector 36, and a signal UOUT which is passed on to the next higher (as illustrated in FIG. 1) channel for which it constitutes the signal UIN. The signals UIN and UOUT are thus chained through the control logic units 38, the signal UOUT produced by the highest (in FIG. 1) working channel, namely channel 1, being supplied as a control signal to the control logic unit 39 for the P channel selector 36. Each signal UOUT is also supplied as an input to the B MUX 34 (and optionally the A MUX 16) of the respective channel, in which multiplexer it is incorporated as one bit in the overhead information in each master frame and thus is transmitted on the P channel in the event of a protection switch, for the purpose described below with reference to FIG. 6.

Various conditions for transitions between the states shown in FIGS. 4 and 5 are shown in these drawings and are described below. Some of these transitions are effected solely under software control, and any of the states can be forced by software control. Such software control is provided by processors which are not shown in the drawings but are provided throughout the system, generally one at each terminal (head end, tail end, or intermediate site) for each channel. The processors co-operate with the control logic units not only to control their states in accordance with the state diagrams but also so that they are aware of the state of the system, and in particular of each protection switch which takes place. The processors communicate with one another via a communications network comprising some of the overhead information on the communications system itself, in a manner which forms the subject of a copending patent application Ser. No. 760,006 filed July 29, 1985 by K. A. Bobey et al., entitled "Communications Network" to which reference is directed in this respect.

In response to each protection switch, the processors control the states of the control logic units as described below so that they are prepared for making a subsequent protection switch.

The manner in which a protection switch is effected is as follows. Initially, each control logic unit 38 is in the READY state 71, and each control logic unit 22 is in the READY state 61, with traffic being routed for each working channel via its A MUX 16, transmitter 10, receiver 14, and A DEMUX 18. While this traffic is being correctly received, the A DEMUX 18 produces the signal QA=1 and (in the absence of a software command forcing a change) the unit 22 remains in the READY state 61, producing the signals UB=0, causing the selector 20 to select the output of the A DEMUX, and PR=0, which is fed via the reverse channel to the unit 38 of the respective channel.

In this normal operating situation, each control logic unit 38 receives, in addition to the signal PR=0, the signal UIN=0 from the unit 38 of the adjacent channel, or from a ground point in the case of the final working channel, and passes this signal to the unit 38 in the next adjacent channel as the signal UOUT. The signal UOUT from the unit 38 of the working channel 1 is supplied to the control logic unit 39 of the protection channel P to control its selector 36, whereby the P channel transmitter 40 receives traffic from the P channel A MUX 16 rather than from a protection traffic line 80. The line 80 passes successively between the selectors 36 of the working channels, each of which selectors 36 is controlled by the signal BR=0 from the respective unit 38 to link the line 80 through the selector and thereby isolate the output of the respective B MUX 34.

In the event of a fault, for example on the working channel 2, the A DEMUX 18 detects a loss of frame synchronization or a mismatched channel identity and produces the signal QA=0. In consequence, the control logic unit 22 of this channel adopts the ARMED state 62, in which it produces the protection request signal PR=1. This signal is transmitted via the reverse channel and received by the control logic unit 38 of the respective channel. Assuming that this unit 38 still receives the signal UIN=0, it adopts the BRIDGING state 72 in which it produces the signals UOUT=1 and BR=1. The former signal is propagated through the control logic units 38 of the other working channels, in this case only the channel 1, inhibiting them from adopting the BRIDGING state, to the control logic unit 39, which thereby controls the selector 36 to couple the protection traffic line 80 to the transmitter 40 of the protection channel. At the same time, the signal BR=1 of the channel 2 being protected causes its selector 36 to couple the output of the respective B MUX 34 to the line 80, whereby this channel's traffic is routed to the protection channel.

At the tail end, the A DEMUX of the channel P detects a channel identity mismatch and squelches its output as already described. The traffic on the protection channel P is also supplied to the B DEMUX 46 of each working channel, which similarly detect channel identity mismatches and squelch their outputs, except for the B DEMUX 46 of the working channel 2 which now detects a channel identity match and produces the signal QB=1. This signal causes the unit 22 to adopt the SWITCHING state 63, in which it produces the signal UB=1 which controls the selector 20 to switch over to supply the outputs of the B DEMUX 46 to the outgoing DS-3 channels, thereby completing a protection path for the traffic on the failed channel.

It should be noted that the protection path is set up in the above manner without relying on any software control. In consequence, the protection switch is accomplished very much more quickly than would be the case if software control, and hence communications among the processors, were required. However, the result of the protection switching as so far described prevents traffic on another, possibly higher priority, channel from being protected instead if that channel fails. In order to accommodate this, software control is now exercised to prepare the protection arrangement to be able to make another protection switch if this should be desired. As already explained, the software control is asserted by processors coupled to the control logic units and communicating with one another via the communications system. The delay in the exercise of the software control due to delays inherent in this communication is of little consequence, because the traffic on the failed channel has already been protected by being transmitted on the protection channel.

The working channels are assigned respective priorities, which are arbitrary as far as the protection arrangements are concerned, in dependence upon which the software control forces the control logic units 22 and 38 to various states. More particularly, for the failed (and now protected) channel the software control forces the unit 22 to adopt the DONE state 64 and the unit 38 to adopt the DONE state 73. As in the DONE state 73 the unit 38 produces the signal UOUT=UIN rather than UOUT=1, the software control also forces the control logic unit 39 for the protection channel P to a state in which its selector 36 couples the line 80 to the transmitter 40, this state being effective whenever protection switching is in effect. For any higher priority working channel, for which the protection channel P must be made available in the event of a failure, the software control forces the unit 22 to (remain in) the READY state 61 and the unit 38 to (remain in) the READY state 71. For any lower priority working channel, for which the protection channel P will not now be made available in the event of a failure, the software control forces the unit 22 to the LOCKOUT state 65 and the unit 38 to the OFF state 74. In these states, which are also used for idle working channels not requiring protection, the signals PR=0 and BR=0, so that no protection switching of these channels can take place until the software control dictates otherwise.

If, following a protection switch and consequent exercise of software control as described above, a higher priority working channel fails, this is protected in a similar manner. Thus the unit 22 of the higher priority failed channel adopts the ARMED state 62 producing the signal PR=1, and the unit 38 of the channel consequently adopts the BRIDGING state 72, producing the signals UOUT=1 and BR=1. If the previously failed channel is above (in FIG. 1) the higher priority failed channel, the signal UOUT=1 produces a signal UIN=1 for the previously failed channel, so that its unit 38 adopts the OFF state 74. In any event, the traffic from the B MUX 34 of the higher priority failed channel is now passed via the line 80 to the protection channel P, ultimately producing the signal QB=1 for this channel so that its unit 22 adopts the SWITCHIHNG state 63 to protect the traffic on this channel and with subsequent software control, in the manner already described. Meanwhile the B DEMUX of the previously failed channel detects a channel identity mismatch, producing the signal QB=0 and squelching its output. If at this time the traffic on the normal route for this channel is correctly received, the A DEMUX produces the signal QA=1, and in response to this combination of signals the unit 22 of the previously failed channel adopts the LOCKOUT state 65 as illustrated in FIG. 4.

Having described the system head end and tail end, intermediate units of the system will now be described with reference to FIG. 6, which can be placed between FIGS. 1 and 2 in order to maintain the illustration of the signal flows.

As already described, at each intermediate site the respective intermediate unit of the system may provide a glass-through, repeater, or drop-and-insert capability for each working channel. FIG. 6 illustrates a drop-and-insert capability for channel 1 and a repeater capability for channel 2, a repeater and selector being provided for the protection channel P. The protection channel P also has a drop-and-insert capability for the optional traffic which may be carried on this channel when protection is not in effect, but this need not be provided. For consistency, in FIG. 6 similar references have been used to those in FIGS. 1 and 2 to denote similar elements, and some corresponding signal paths have been omitted for clarity.

Referring to FIG. 6, for each repeatered working channel, such as the channel 2, the intermediate unit includes an optical receiver 14 and an optical transmitter 10 which are coupled via a repeater interface unit (RIU) 90, the RIU consisting of a demultiplexer and multiplexer coupled together in sequence. The RIU 90 thus permits recovery of overhead information from the respective channel at a repeater site, and can have a form similar to that of an A MUX 16 and A DEMUX 18 in combination.

The protection channel P similarly includes an RIU 90, but in this case the output of the RIU is coupled to the respective transmitter 40 via a selector 36, which is controlled by the control logic unit 39 to supply to the transmitter either the output of the RIU 90 or traffic from the protection traffic line 80. As in FIG. 1, the line 80 is chained through selectors 36 of the working channels, but in this case only those working channels having drop-and-insert capabilities have selectors 36. Such a situation is shown for channel 1, for which the intermediate unit comprises components substantially the same as those at the tail end (FIG. 2) for dropping DS-3 channel traffic and components substantially the same as those at the head end (FIG. 1) for inserting DS-3 channel traffic. Finally, FIG. 6 also shows the A DEMUX 18 and A MUX 16 for respectively dropping and inserting via the line 80 optional extra DS-3 channel traffic having the lowest priority.

In the event of a failure of channel 2, because this channel is only repeatered in the intermediate unit in FIG. 6 its traffic must be protected by routing it through the RIU 90 and selector 36 of the protection channel, and hence via the protection channel spans on both sides of the intermediate unit. In the event of a failure of channel 1, for example on the span on the receive side (left as illustrated) of the intermediate unit, however, its traffic need only be routed via the corresponding span of the protection channel, i.e. on only one side of the intermediate unit, leaving the protection channel span on the other side free for carrying the optional extra traffic or for protecting corresponding spans of working channels on this other side of the intermediate unit.

In order to accommodate this, as already mentioned with reference to FIG. 1 the signal UOUT from each control logic unit 38 is supplied as an input to the corresponding B MUX 34 to be transmitted as one bit, referred to below as a signal U, in the overhead information on the protection channel, and as also already mentioned with reference to FIG. 4, each control logic unit 22 also produces the signal BI whose value is shown in FIG. 4 for the various states which the unit 22 may assume. The signal BI is applied from each control logic unit 22 to a line 92 which as shown in FIG. 6 is terminated with a pull-down resistor 94 to serve a wired-OR function for all of the units 22, so that a signal BI=1 produced by any of the control logic units 22 produces this signal BI=1 on the line 92.

The signal U in the overhead information on the protection channel is derived in the RIU 90 and is supplied to the control logic unit 39 for the protection channel, as is the signal BI on the line 92. If the signal U=1, indicating that the protection channel is carrying protection traffic from a failed channel, and the signal BI=0, indicating that the failed channel is repeatered (or glassed through) in this intermediate unit, then the unit 39 controls the selector 36 to couple the output of the RIU 90 to the transmitter 40 to bridge the protection traffic through the intermediate unit. If, instead, the signals U=1 and BI=1, then the unit 39 controls the P channel selector 36 to connect the line 80 to the transmitter 40, as the protection traffic relates to a drop-and-insert channel at this intermediate unit and need not be bridged through the intermediate unit on the protection channel.

While the control logic units 22 and 38 have been shown as separate blocks in FIG. 6, it should be appreciated that they can conveniently be combined to form a single control logic unit.

Numerous modifications, variations, and adaptations may be made to the particular embodiment of the invention which has been described above without departing from the scope of the invention as defined in the claims.

What is claimed is:

1. In a communications system comprising communications channels extending between first and second locations, the channels comprising at least one forward channel for carrying traffic in normal operation from the first location to the second location, a protection channel for carrying the traffic of a forward channel in the event of a fault on the forward channel, and at least one reverse channel for carrying signals from the second location to the first location, a method of controlling routing of traffic to the protection channel comprising the steps of:

detecting at the second location a fault on a forward channel;

transmitting an indication of the fault via a reverse channel from the second location to the first location;

in response to the fault indication, supplying traffic of the forward channel having the fault to the protection channel, the traffic supplied to the protection channel including an identity of the forward channel having the fault; and at the second location, replacing the traffic of the forward channel having the fault with the traffic supplied via the protection channel in dependence upon the channel identity in the traffic on the protection channel.

2. A method as claimed in claim 1 wherein there is a plurality of forward channels and a corresponding number of reverse channels, and the indication of a fault on one of the forward channels is transmitted from the second location to the first location on a corresponding one of the reverse channels.

3. A method as claimed in claim 2 wherein the forward and reverse channels constitute respectively reverse and forward channels for the opposite direction of transmission, from the second location to the first location, a reverse protection channel being provided for protecting traffic carried in said opposite direction of transmission.

4. A method as claimed in claim 2 wherein the step of supplying traffic of a forward channel having a fault to the protection channel comprises controlling a selector of the forward channel having the fault to supply the traffic of the forward channel having the fault to the protection channel, and inhibiting a selector of each other channel from supplying traffic to the protection channel.

5. A method as claimed in claim 4 wherein the forward channels have respective protection priorities, the method including the step of enabling, following the inhibition of the selector of each other channel, the selector of each channel having a higher priority than that of the channel having the fault, to supply traffic to the protection channel in response to a fault indication indicating a fault on the higher priority channel.

6. A method as claimed in claim 1 wherein the channel identity constitutes part of the traffic on each forward channel.

7. A method as claimed in claim 3 wherein the channel identity constitutes part of the traffic on each forward channel, and wherein the traffic on each channel is transmitted in a time division multiplexed frame structure including bits for the channel identity and the indication of a fault.

8. A method as claimed in claim 1 and including the steps of:
transmitting information via the protection channel when traffic from a forward channel is not being supplied thereto;
supplying traffic of a forward channel having a fault to the protection channel with an indication that the traffic is protection traffic; and, at the second location:
detecting said indication in the traffic on the protection channel to produce a repeater control signal;
producing an inhibit signal in response to detection of a fault on a forward channel; and
repeating the traffic on the protection channel for transmission from the second location to a third location in response to the repeater control signal in the absence of the inhibit signal.

9. A method as claimed in claim 7 and including the steps of:
transmitting information via the protection channel when traffic from a forward channel is not being supplied thereto;
supplying traffic of a forward channel having a fault to the protection channel with an indication that the traffic is protection traffic; and, at the second location:
detecting said indication in the traffic on the protection channel to produce a repeater control signal;
producing an inhibit signal in response to detection of a fault on a forward channel;
repeating the traffic on the protection channel for transmission from the second location to a third location in response to the repeater control signal in the absence of the inhibit signal;
wherein the frame structure includes a bit for said indication in the traffic on the protection channel.

10. A method as claimed in claim 1 wherein the communications channels comprise optical fiber transmission channels.

11. A communications system comprising:
communications channels extending between first and second locations, the channels comprising at least one forward channel for carrying traffic in normal operation from the first location to the second location, a protection channel for carrying the traffic of a forward channel in the event of a fault on the forward channel, and at least one reverse channel for carrying signals from the second location to the first location;
means at the second location for detecting a fault on each forward channel and for producing a fault indication in response to such detection;
means for transmitting the fault indication via a reverse channel from the second location to the first location;
means at the first location responsive to the fault indication for supplying traffic of the forward channel having the fault to the protection channel with an identity of the forward channel having the fault; and
means at the second location for replacing the traffic of the forward channel having the fault with the traffic supplied via the protection channel in dependence upon the channel identity in the traffic on the protection channel.

12. A system as claimed in claim 11 wherein there is a plurality of forward channels and a corresponding number of reverse channels, the means for transmitting the fault indication for each forward channel comprising means for multiplexing said indication in traffic transmitted in an opposite direction of transmission on a corresponding reverse channel.

13. A system as claimed in claim 12 wherein the forward and reverse channels constitute respectively reverse and forward channels for the opposite direction of transmission, from the second location to the first location, the system including a reverse protection channel for similarly protecting traffic in said opposite direction of transmission.

14. A system as claimed in claim 13 wherein the multiplexing means comprises means for multiplexing the channel identity in the traffic of each channel.

15. A system as claimed in claim 14 wherein the means for supplying traffic to the protection channel comprises, for each forward channel, selector means for selectively coupling traffic of the channel to the protection channel and control means responsive to the fault indication for controlling the selector means, the control means being interconnected and arranged so that the selector means are controlled to couple the traffic of only one channel at a time to the protection channel.

16. A system as claimed in claim 15 wherein the control means of each forward channel includes an output for coupling to an input of the control means of another forward channel, said output being coupled to an input of multiplexing means of the respective forward channel.

17. A system as claimed in claim 15 and including selector means for supplying traffic to the protection channel when there is no fault indication on any of the forward channels.

* * * * *